(12) United States Patent
Leeds

(10) Patent No.: US 11,272,788 B2
(45) Date of Patent: Mar. 15, 2022

(54) METHOD FOR ENHANCING COMFORT OF A SEAT

(71) Applicant: Comfort Concepts, LLC, New York, NY (US)

(72) Inventor: Richard M. Leeds, New York, NY (US)

(73) Assignee: Comfort Concepts LLC, New York, NY (US)

( * ) Notice: Subject to any disclaimer, the term of this patent is extended or adjusted under 35 U.S.C. 154(b) by 0 days.

(21) Appl. No.: 16/911,470

(22) Filed: Jun. 25, 2020

(65) Prior Publication Data

US 2020/0323348 A1    Oct. 15, 2020

Related U.S. Application Data

(63) Continuation-in-part of application No. 16/288,155, filed on Feb. 28, 2019, now Pat. No. 10,694,864.

(60) Provisional application No. 62/636,965, filed on Mar. 1, 2018.

(51) Int. Cl.
| | |
|---|---|
| *A47C 7/14* | (2006.01) |
| *A47C 7/02* | (2006.01) |
| *A47C 1/02* | (2006.01) |
| *A47C 31/11* | (2006.01) |
| *A47C 27/14* | (2006.01) |

(52) U.S. Cl.
CPC .............. *A47C 7/0213* (2018.08); *A47C 7/14* (2013.01); *A47C 1/02* (2013.01); *A47C 27/14* (2013.01); *A47C 31/11* (2013.01)

(58) Field of Classification Search
CPC .......... A47C 7/14; A47C 7/0213; A47C 31/11; A47C 27/14
See application file for complete search history.

(56) References Cited

U.S. PATENT DOCUMENTS

| | | | | |
|---|---|---|---|---|
| 3,278,226 A | * | 10/1966 | Magnusson ............ | A47C 27/15 297/228.1 |
| 4,844,539 A | * | 7/1989 | Seibert .................... | A47C 31/11 297/228.13 |
| 5,403,066 A | * | 4/1995 | Drum .................... | B60N 2/6054 297/219.1 |
| 6,830,293 B2 | * | 12/2004 | Vanderminden ....... | A47C 31/00 297/219.1 |
| 10,282,914 B1 | * | 5/2019 | Tran ........................ | G01G 19/44 |

* cited by examiner

*Primary Examiner* — Syed A Islam
(74) *Attorney, Agent, or Firm* — Gerald E. Hespos; Michael J. Porco; Matthew T. Hespos

(57) ABSTRACT

A method is provided for enhancing comfort of a seat with a hip/thigh support and a back support. The method includes providing a seating pad assembly with a foam cushion made at least partly of a viscoelastic foam and having a cover formed from a dimensionally stable non-stretch material. An upper area of the seating pad assembly is attached to an upper area of the seat back. Pelvic and upper back areas of a person sitting on the seat deform the viscoelastic foam sufficiently to provide a comfortable support and to define anchors for the seating pad assembly. The non-stretch cover extends between those anchors for effectively supporting and cradling the lumbar back area of the person in the seat above and forward of the corner between the seat back and the hip/thigh support.

15 Claims, 11 Drawing Sheets

METHOD FOR ENHANCING COMFORT OF A SEAT

This application claims priority on U.S. Provisional Application No. 62/636,965 filed on Mar. 1, 2018, and is a continuation-in-part of application Ser. No. 16/288,155 filed Feb. 28, 2019, the entire disclosure of which are incorporated herein by reference.

BACKGROUND

1. Field of the Invention

The invention relates to an accessory to make a seat more comfortable and to a method for making a seat comfortable.

2. Description of the Related Art

Travel by any mode of transportation, such as planes, trains, buses and cars, is rarely comfortable and can be extremely uncomfortable on long trips. The length of time after which a seat will be considered comfortable varies widely based on the characteristics of the seat and sensitivity of the traveler. Many travelers become extremely uncomfortable after an hour or two on a transportation seat, especially since seats intended for shorter trips generally do not recline or recline only a small amount. On the other hand, intercontinental flights can last in excess of twelve hours and are common for many business people. Most business travelers have little time for recovery at the end of a business trip, regardless of the mode of travel, and are expected to be alert and functioning for a business meeting shortly after their arrival. Vacation travelers suffer from the same inconveniences as business travelers and are likely to require a considerable recovery time before being able to enjoy the vacation. Uncomfortable travel is not limited to airlines. In particular, trips via train, bus or car can take longer than an intercontinental airline trip. Travel related discomfort also is not limited to the time spent in the vehicle. More particularly, travelers often spend hours in very uncomfortable seats at an airline, train or bus terminal while they are waiting for a transfer or a delayed departure. Seats at a terminal often are less comfortable than seats on a plane, train or bus. Terminal seats and seats on any transportation vehicle often have a gap between the hip/thigh support and the back support. Uncomfortable seats are not limited to transportation seats. For example, many people sit in uncomfortable office chairs or desk chairs for hours on end. Stadium seats generally are even less comfortable than transportation seats and office chairs or desk chairs.

U.S. Pat. No. 7,461,894 relates to a seating pad assembly that is particularly well suited for use on airlines or other transportation vehicles. The disclosure of U.S. Pat. No. 7,481,894 is incorporated herein by reference. The seating pad assembly disclosed in U.S. Pat. No. 7,461,894 comprises a foam that consists of or comprises a viscoelastic foam with sufficient thickness and resiliency to conform to the shape of the passenger and the shape of the seat without having the passenger bottom out on the seat. Thus, the viscoelastic foam seating pad allows the passenger to be supported comfortably above the seating surfaces and without being affected by gaps that are likely to exist between vertical and horizontal components of the seat or between other movable components of the seat.

U.S. Pat. No. 7,461,894 explains that the seating pad assembly includes a cover mounted over the viscoelastic cushion. The patent explains that the cover assembly is stretchable or sufficiently loose to deform easily into gaps or other pinch points defined in the seat. Thus, the cover assembly disclosed in U.S. Pat. No. 7,461,894 will not restrict or limit the ability of the viscoelastic material to flow or otherwise conform to the shapes of the seat and the traveler, and the nonrestrictive cover assembly will move easily with the viscoelastic material as the viscoelastic material changes its shape.

Continued research in the field of seating pads has led to information that previously was not considered. For example, seats vary widely from one another in terms of dimensions, resiliency and the locations of surface discontinuities that are likely to lead to discomfort. Additionally, people differ widely from one another in terms of size, weight and comfort expectations. Still further, a sitting person and the seating pad interact differently with one another at different locations along the pad and along the person sitting on the pad. For example, the pelvic area of the person will define an area of weight concentration on the pad when the seat is not inclined or inclined only partly, and the pelvic area will benefit greatly from the effects of the viscoelastic foam cushion. The upper back region will be another area that applies forces to the viscoelastic foam cushion when the sitting person leans back and/or when the seat is reclined or partly reclined, and the upper back will receive the supporting benefits of the pad. The lumbar region of the back is an area that often is subject to back problems. However, the lumber region curves away from the seat when the seat is erect or partly reclined. Accordingly, the lumber region will exert less force or no force on the viscoelastic foam cushion, and hence will receive a smaller benefit from the viscoelastic foam cushion. Thus, for some people and for some seats, the area of the back that has the greatest potential for back problems may not achieve the benefits associated with the viscoelastic foam cushion.

A seating pad should extend along the entire front-rear dimension of the horizontal hip/thigh support of the seat and along the back support of the seat through the lumbar region and to upper areas of the back. However, seating pads for long distance travel desirably should extend sufficiently along the seat back to support the head of the traveler when the seat is reclined and to support at least the calves of the traveler when the seat is reclined and/or the legs are elevated.

Profit motives have caused most airlines to reduce the dimensions of each seat to fit at least one extra row of seats on the plane. Similar problems arise with other modes of transportation. As a result, there are significant differences between seat dimensions from one airline to another, from one class of travel to another and from one transportation mode to another. A traveler who appreciates the additional comfort of a viscoelastic foam pad may want a pad that extends sufficiently along the seat back to support the head of the traveler and sufficiently forward from the seatback to support the legs on an elevated and extended leg rest. However, the different dimensions of transportation seat complicate efforts of travelers to ensure comfort on all of their trips. A pad that is sufficiently long to accommodate the largest of the airline seats would be too long for airlines that have smaller seats or for most automobiles. Conversely, a pad dimensioned for use in a passenger car or at a desk could be too short for use on a first class airline seat. As a result, the passenger would be burdened with the additional weight and size of the large viscoelastic foam pad during the duration of the trip when the passenger is not actually on the plane and when the pad is used in a car or at a desk. Furthermore, the passenger is not permitted to fold the top of a long pad over the back support of airline seat and into an area that would intrude on the space of a passenger sitting behind that seat. Additionally, a long pad that extended onto the floor would be easy for a passenger to trip on. A passenger who wanted a special pad for each of the variously dimensioned transportation seats would incur the cost penalty of purchasing plural seating pads when only one of the seating pads can be used on any particular trip or with any particular mode of transportation. These problems could be solved for air travelers by having airlines supply the seating pads for all seats or as an option that could be rented by a traveler on any particular flight. However, the airline then would have a problem of storing the unused pads on the plane. Furthermore, at least the outer cover of each pad would require cleaning between successive uses by the different travelers, thereby imposing a significant cost penalty on the airlines at a time when both the airlines and the consumers are sensitive to transportation costs. This possible approach would not help for travel in personal automobiles Passenger comfort and convenience also is affected by the need to transport the pad to and from the transportation vehicle. The total weight of the pad and the thickness of the pad can affect the convenience for the passenger. Even a small reduction in the thickness of the pad would be well received commercially if that thickness reduction did not have an adverse effect on passenger comfort when seated.

Passenger comfort also can be affected by the pad coverings. In this regard, the seating pad assembly disclosed in U.S. Pat. No. 7,461,894 has an inner covering that is intended to protect the viscoelastic foam cushion and an outer covering that is intended to be more attractive and possibly to carry trademarks or decorative images. The teaching of U.S. Pat. No. 7,461,894 is to have the covers be sufficiently loose and stretchable to permit the viscoelastic foam cushion to deform easily into gaps or other pinch points on the seat. U.S. Pat. No. 7,461,894 explains that the seating pad assembly includes a cover assembly mounted over the viscoelastic foam cushion. The patent explains that the cover assembly is stretchable or sufficiently loose to deform easily into gaps or other pinch points defined in the seat. More particularly, the teaching in the prior art is that the cover assembly should not restrict or limit the ability of the viscoelastic material to flow or otherwise conform to the shapes of the seat and the traveler so that the nonrestrictive cover assembly will move easily with the viscoelastic foam material as the viscoelastic foam material changes its shape. However, a loose inner fabric has the potential to bunch up and cause discomfort to the passenger. Furthermore, better lumbar support would be well received.

In view of the above, it is an object of the invention to provide a seating pad assembly that provides good support and comfort for all areas of the sitting person that contact the seating pad assembly.

Another object of the invention is to provide a seating pad assembly that provides enhanced support and comfort for the lumbar region of the back.

A further object of the invention is to provide a seating pad assembly that prevents bunching or creasing of a cover.

Still another object of the invention is to maximize the comfort without requiring a person to carry a seating pad that is larger than needed.

SUMMARY OF THE INVENTION

The invention relates to a seating pad assembly for use with a seat, such as a transportation seat, an office chair, a desk chair, a stadium seat or any other seat used in an indoor or outdoor environment. The invention further relates to the combination of a seating pad assembly and one of the above-described seats. The seat may be a transportation seat, such as a seat employed in planes, trains, buses and/or private automobiles. The seat includes a generally horizontal hip/thigh support and a seat back pivotally mounted to the hip/thigh support. The seat may further include a foot rest. The seat back and/or the foot rest preferably are mounted for pivoting relative to the hip/thigh support. Accordingly, seams, cracks, creases, gaps or spaces exist between the back rest and the hip/thigh support and between the hip/thigh support and the leg extension. Decorative seams also exist on many seats and create surface irregularities that can be sensed by the person sitting in the seat. Some of these gaps exceed 1 cm in width and/or depth. The seat may further include arm rests spaced from one another by approximately the width of the seat. The spacing between the arm rests, and hence the width of the seat, may vary in accordance with the type of seat (e.g. office seat versus transportation seat), the mode of transportation and the class of service. Additionally, the front to rear dimension or the vertical dimension of these various components of the seat vary from one seat to another, from one transportation provider to another and from one class of service to another.

The seating pad assembly includes a foam that consists of or comprises an open cell foam, such as a viscoelastic foam. For example, the foam may consist entirely of a viscoelastic foam or may be a laminated structure with one or more layers of a viscoelastic material laminated to a foam that is not viscoelastic. Alternatively, a viscoelastic foam may be disposed where the person normally will sit, while a different type of foam may be bonded to the viscoelastic in lateral regions of the seating pad. The pad also may include a gel layer or gel beads incorporated into the foam. The foam cushion of the pad may be generally rectangular. The foam cushion may have a width corresponding approximately to the width of the intended seat and a length approximately equal to the sum of the length of the hip/thigh support and the length of the back support for the seat (e.g. a typical coach class seat, an automobile seat, an office chair or the like). Specifically, the viscoelastic foam cushion for economy class travel may be at least about 40-50 inches long and preferably about 47 inches long. The viscoelastic foam cushion for economy class travel also may be about 18-20 inches wide and about 1 inch thick. Other dimensions may be selected for a seating pad assembly intended for other end uses, such as automobile seats, office chairs, desk chairs, outdoor furniture, stadium seats and such. For example, a seating pad assembly for a typical office chair or desk chair may have a length of about 38 inches.

The seating pad assembly also comprise an outer cover that may be removable from the viscoelastic foam cushion for cleaning as needed. The outer cover may be decorative and may be formed from a material that will resist stains, such as those that are attributable to spilled food or beverages. At least one side of the outer cover also may have regions with friction coefficients that will resist slipping of the seating pad assembly on the seat. For example, the outer pad may have local areas supplemented with an elastomer or rubber material that will exhibit a frictional engagement with the surface of the seat to prevent slippage or collapsing of the seating pad assembly during use. The outer cover also may be made with fibers that have anti-slip characteristics or that are modified to have such characteristics. The seating pad assembly also may comprise an inner cover for protecting the viscoelastic foam cushion, particularly during cleaning. The inner cover may remain on the pad during laundering of the pad, but also may be removed to be washed separately from the pad.

At least one of the inner and outer covers of one embodiment is formed from a dimensionally stable non-stretchable material, such as woven cotton yarns, woven polyester fibers, a woven blend of cotton yarns and polyester fibers or woven materials made of other dimensionally stable synthetic fibers (e.g. Rayon, polyurethane, polypropylene, polyethylene terephthalate and nylon) with or without cotton yarns. The dimensionally stable non-stretchable material also can be a nonwoven material formed from non-stretchable fibers having different melting temperatures. The nonwoven material can be exposed to heat sufficient to cause the fibers with the lower melting temperature to melt or soften so that the different fibers attach to one another upon cooling and possibly upon calendaring, thereby achieving the non-stretch characteristics. The dimensionally stable non-stretchable material also can be a mesh material or an extruded material possibly with perforations or slits for breathability. The cover is dimensioned to closely engage and essentially encapsulate the viscoelastic foam cushion. Woven material can roll and bend, but is dimensionally stable and therefore will not stretch at least in the direction of the warp and filling. The woven cover may be constructed of a fabric having a thread count in a range from a minimum warp and filling of approximately 110×76 to a maximum warp and filling of approximately 220×140. The warp or the filling of a woven fabric of some embodiments are aligned to extend from an upper end of the back support to the front end the hip/thigh support to achieve the dimensionally stable non-stretch characteristics to cradle the lumbar region of the back. Additionally, the fabric may have a yarn size in a range of 32×32 to 60×60 singles. Furthermore, the fabric may have a weight of approximately 3.0 oz. per square yard to 4.4 oz. per square yard. In some embodiments, the sheet of material of the outer cover that faces the seat is formed from a dimensionally stable non-stretch material to help hold the seating pad in a fixed position on the seat, while the sheet of material of the outer cover that faces away from the seat may be softer and more comfortable. For example, the sheet of material of the outer cover that faces away from the seat may be a brushed material and, in some embodiments, may be a knit material.

Unlike knitted materials, woven fabrics may bend to follow the general alignment of the hip/thigh support and the back support, but will not stretch in response to forces exerted on the materials. The use of a dimensionally stable, non-stretch, close-fitting woven cover on a viscoelastic foam cushion significantly affects the way the cushion will react to forces exerted by a person sitting on a seat that has a viscoelastic foam cushion removably positioned thereon. In particular, the viscoelastic foam will behave like a denser and more firm foam and therefore will be somewhat less likely to flow into small cracks and crevices in the seat. However, the seating pad assembly still will conform to the shape of areas of the body that exert forces on the viscoelastic foam cushion and will enable an effective floating of the person on the viscoelastic foam above the surface discontinuities in the seat. Additionally, the dimensionally stable, non-stretch, close-fitting cover (e.g. woven cover) will prevent the viscoelastic foam from flowing into the corner between the hip/thigh support and the seat back when the seatback is in a generally erect orientation to the hip/thigh support. Rather, the seating pad with the close-fitting woven cover will extend at an acute angle between the hip/thigh support and the seatback, thereby giving support to the lower back of the passenger that would otherwise not be present. This additional support is generally in the lumbar region, which often is an area of discomfort during long periods of sitting. In particular, the weight of the sitting person will effectively anchor the seating pad assembly to the seat at locations where the pelvic area and the upper back or shoulder blades exert forces on the seating pad assembly. However, a sling-like effect or cradling effect will be created between these angularly aligned supports or anchor locations and will extend through the lumbar region of the back. Thus, the lumbar region of the back will be supported or cradled comfortably by the dimensionally stable non-stretch woven cover in those situations where the physiology of the person will not cause a sufficient load to generate significant deformation of the viscoelastic foam material at locations aligned with the lumbar region.

The desirable effects of the above-described closely engaging woven inner cover will be substantially unaffected by any outer cover that may be used. Thus, the assembly of a viscoelastic foam cushion with a woven inner cover can be used with any outer cover while still achieving the above-described advantages of the woven closely engaging inner cover.

The combination of the viscoelastic foam cushion with the woven cover that closely engages and encloses the viscoelastic foam cushion can achieve adequate cushioning with a thinner viscoelastic foam cushion. Even a small reduction in pad thickness can achieve a noticeable reduction in carrying weight and a small but significant decrease in material cost.

The seating pad assembly may comprise a main pad and at least one extension that is removable from the main pad. The extension also may comprise a viscoelastic foam and inner cover surrounding the viscoelastic foam and an outer cover removably attached to the viscoelastic foam.

The extension may be attached to the outer cover of the main pad along a connection line extending transverse to the front-to-rear direction or the vertical direction. The area of connection between the main pad and the extension preferably is flexible so that the extension can be rotated through at least 180° between an extended position where the extension is substantially coplanar with the main pad and a folded condition where the extension is in substantially face-to-face contact with an adjacent area of the main pad. The extended position of the extension relative to the main pad will be used when the seat is a business class transportation seat or first-class transportation seat. The folded condition may be used when the seat conforms to the length dimensions of the main pad. The folded pad then can be used as a head pillow or leg extension or leg rest if desired by the traveler.

The extension preferably is attachable to the main pad by an attachment device that is easily attachable and detachable by a traveler on the transportation vehicle. In this regard, a conventional zipper conceivably could be employed, but may be too cumbersome to be manipulated conveniently by the traveler. A tongue and groove connection can be used instead of a zipper but also may be difficult to manipulate. A mateable pair of hook and loop fabric fasteners may be employed, such as those sold under the trademark VELCRO. However, there is a concern that the hook component of some hook and loop fastening combinations can cause skin irritation and could damage clothing of the traveler or could damage a seat cover of the seat. Accordingly, a flap may be attached to the outer cover and can be moved between a protective position where the flap covers the hook and loop fastening device and a use position where the hook and loop fastening device is exposed for attachment to a mating fastening device. The flap may be provided with a hook or loop fastener that can attach to the hook or loop fastener on the outer cover of the pad. Thus, the flap can be secured releasably in the protective position. The hook or loop fastener on both the outer cover and on the flap may be a strip that extends continuously across the seating pad assembly. However, local regions with a hook or loop fastener may be sufficient, particularly for the flap.

The at least one extension may comprise first and second extensions at opposite longitudinal ends of the main pad. Each extension may be attached releasably to the main pad.

The invention also is directed to a method for enhanced support of a person on a seat. The method includes providing a seat having a hip/thigh support and a back support extending angularly from the hip/thigh support, and providing a seating pad assembly having opposite first and second longitudinal ends, a foam cushion formed at least partly from a viscoelastic foam, at least one cover covering and closely encapsulating the foam cushion. The at least one cover may be formed from a dimensionally stable material that is non-stretchable at least in a direction extending from the first longitudinal end to the second longitudinal end. At least one attachment means is in proximity to the first longitudinal end of the seating pad assembly. The method proceeds with a step of removably attaching the attachment means to a part of the back support of the seat remote from the hip/thigh support and positioning an area of the seating pad assembly adjacent the second longitudinal end of the seating pad assembly at a position on the seat spaced from the back support of the seat while keeping the seating pad assembly spaced from an intersection of the hip/thigh support and the back support. The method then includes sitting on the hip/thigh support, and leaning back against an area of the back support spaced from the hip/thigh support so that the foam cushion encapsulated by the cover formed from the dimensionally stable non-stretchable material cradles a lower back region above an end of the hip/thigh support that extends angularly from the back support.

The attachment means may comprise straps secured to an area of the cover in proximity to the first longitudinal end of the seating pad assembly, and the step of attaching the attachment means to a part of the back support of the seat remote from the hip/thigh support comprises attaching the straps to an area of the back support remote from the hip/thigh support.

The at least one cover may comprise an outer cover with opposite first and second sheets of outer material. Regions of the first sheet of outer material may have frictional characteristics that resist sliding of the seating pad assembly on the seat. The step of attaching the attachment means to a part of the back support of the seat remote from the hip/thigh support may comprise positioning the seating pad assembly so that the regions of the first sheet of the outer material with the frictional characteristics that resist sliding of the seating pad assembly on the seat face toward the seat back The seat may be an automobile seat with a head rest at an end of the back support of the seat remote from the hip/thigh support. The step of attaching the straps to an area of the back support remote from the hip/thigh support may comprise attaching the straps to the head rest or a support of the head rest. The seat also may be an office chair and the step of attaching the straps to an area of the back support remote from the hip/thigh support may comprise crisscrossing the straps to engage upper corner regions of the chair.

BRIEF DESCRIPTION OF THE DRAWINGS

FIG. 16 is a front elevational view of the fully erect airline seat of FIG. 1 with a main pad of a seating pad assembly in accordance with an embodiment of the invention.

DETAILED DESCRIPTION

Figure 1:
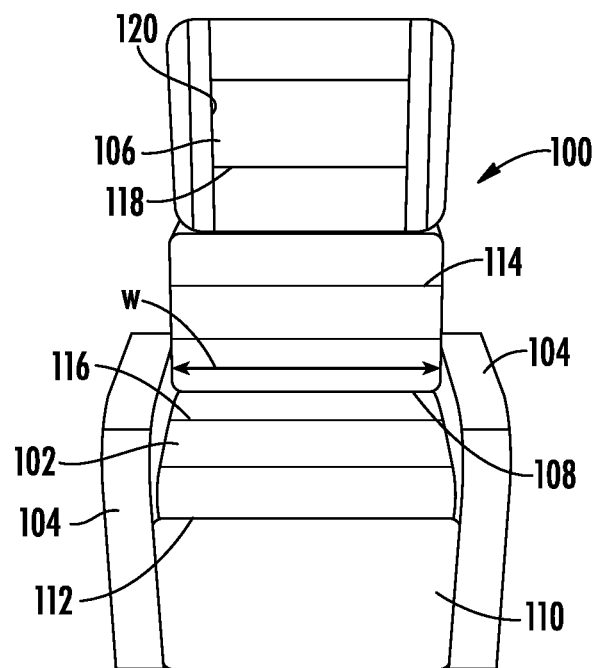
FIG. 1 is a front elevational view of a prior art airline seat in an erect condition.

A seating pad assembly in accordance with the subject invention can be used on any indoor or outdoor seat, such as a transportation seat, an office chair, a stadium seat or the like. The embodiment illustrated herein shows a seating pad assembly used on a transportation seat, such as the airline seat 100 shown in FIG. 1. However, the seating pad assembly is not limited to use on the illustrated transportation seat. The seat 100 of the illustrated embodiment includes a hip/thigh support 102 disposed between two armrests 104. A back support 106 is hinged to the hip/thigh support 102 and can move between the substantially erect position shown in FIG. 1 and a partly reclined position (not shown). The back support 106 in some airline seats 100 also can be pivoted to a fully reclined condition where the back support 106 is substantially in the same plane as the hip/thigh support 102. A gap 108 necessarily exists between the hip/thigh support 102 and the back support 106 to accommodate the relative pivoting movement. The seat 100 also may have a foot rest 110 that is hinged relative to the hip/thigh support 102. A gap 112 exists between the hip/thigh support 102 and the foot rest 110. Other cracks, creases and seams 114, 116, 118 and 120 exist at other locations on the hip/thigh support 102 and the back support 106.

Figure 5:
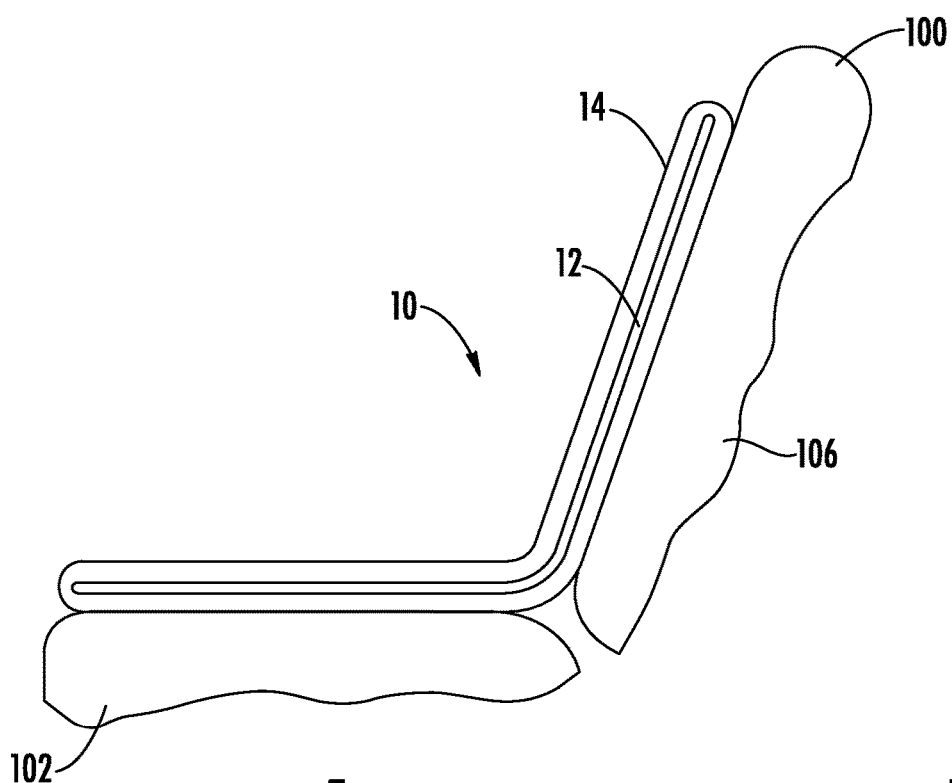
FIG. 5 is a longitudinal cross-sectional view of the airline seat similar to FIG. 2, but showing the seating pad assembly positioned on the seat prior to having a passenger sit on the seat.
Figure 6:
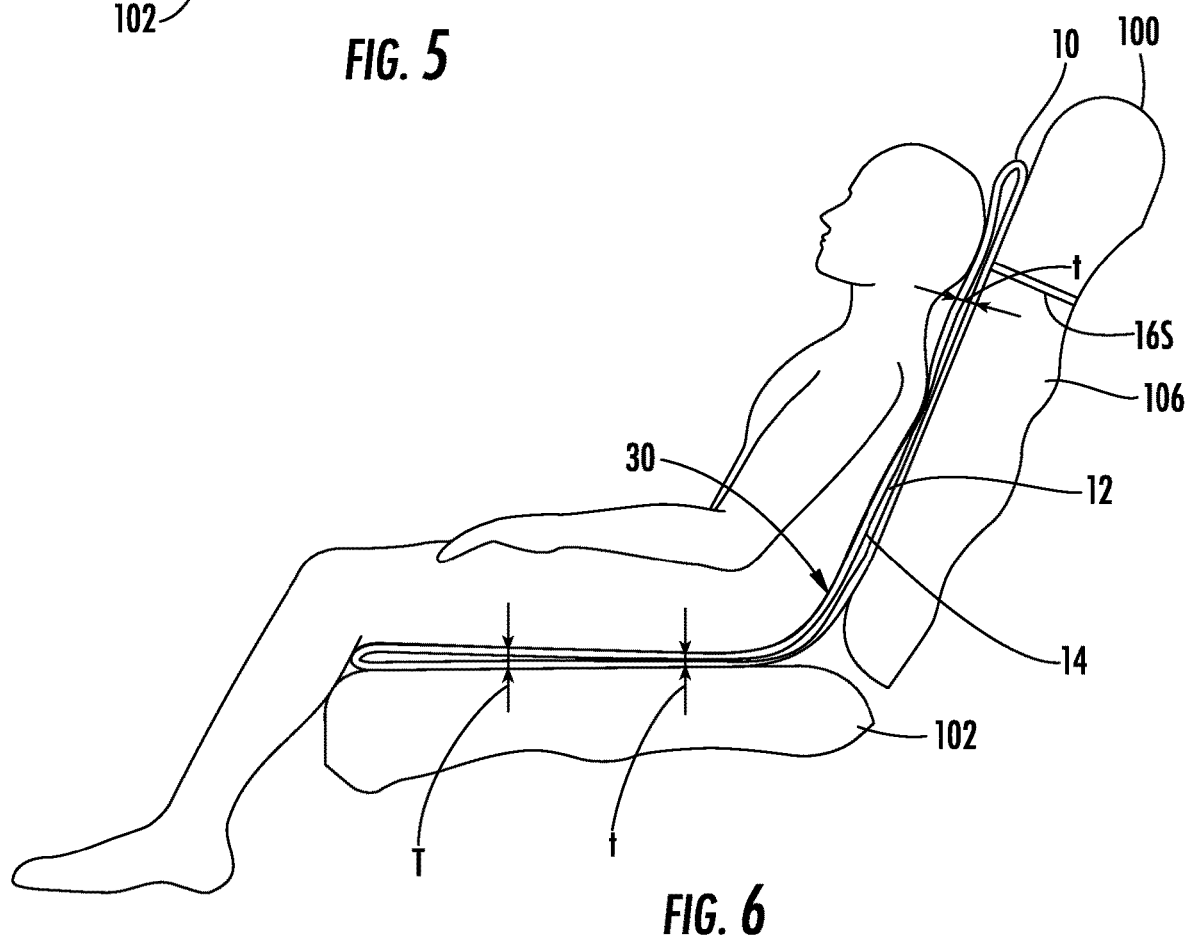
FIG. 6 is a longitudinal cross-sectional view similar to FIG. 5, but showing the airline passenger sitting on the seating pad assembly.
Figure 7:
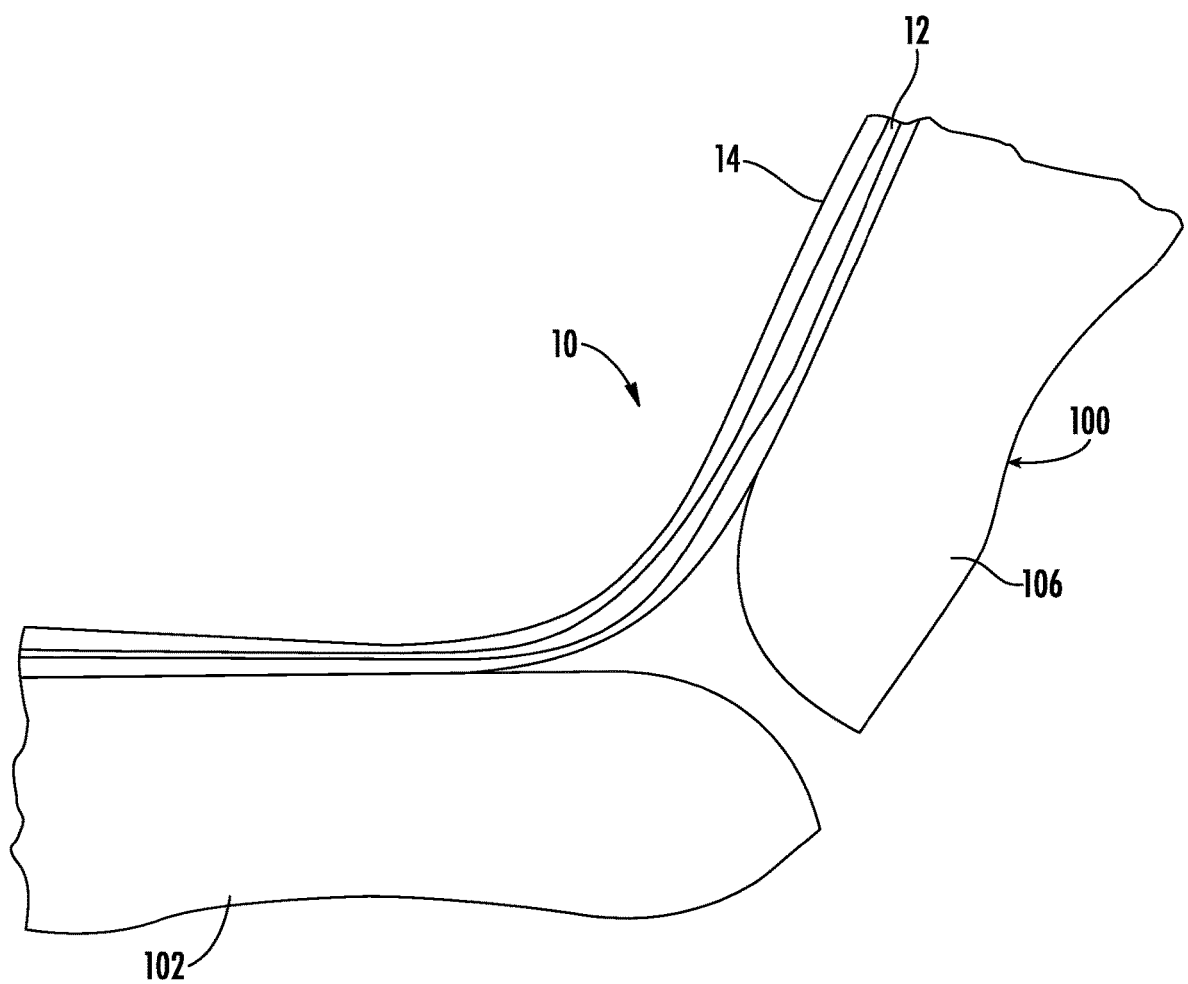
FIG. 7 is a schematic view showing the shape changes of the viscoelastic foam cushion and the inner cover during use.

A seating pad assembly in accordance with an embodiment of the invention is identified generally by the number 10 in FIGS. 3-7. The seating pad assembly 10 includes an inner cushion 12 that consists of or comprises a viscoelastic foam that may be similar to those that are available from several commercial sources. However, a preferred inner cushion 12 consists of a viscoelastic foam that has a density of about 5 lb/ft$^3$ and a firmness of about 30-40 lbf. Firmness often is referred to as a measure of Indentation Force Deflection (IFD). A viscoelastic foam with a firmness or IFD near the upper end of this range, such as 40 lbf, is well suited for use with a seating pad assembly that has a woven cover as explained below. The seating pad assembly 10 also includes an inner cover 14 and an outer cover 16. The inner cover 14 is disposed removably in surrounding relationship around the viscoelastic foam cushion 12 and the outer cover 16 is disposed removably in surrounding relationship around the inner cover 14. The viscoelastic foam cushion 12 is substantially rectangular and has opposite sides 18 and 20 and opposite first and second ends 22 and 24 extending between the sides 18 and 20. The sides 18 and 20 are spaced apart by a width W that preferably is in a range of 16-20 inches. The ends 22 and 24 are spaced from one another by a length L1 that substantially corresponds to a sum of the lengths of the hip/thigh support 102 and the back support 106 of the seat 100, such as a typical transportation seat 100, as shown in FIG. 1. For example, a length L1 of the viscoelastic foam cushion 12 may be approximately 42-48 inches for a transportation seat. The length L1 for a desk chair may be about 38 inches. The thickness of the viscoelastic foam cushion 12 may be about 0.75-1.00 inch. The thickness of the pad illustrated in FIGS. 5-7 is exaggerated to help show the effect of the load applied by the sitting person.

The inner cover 14 is formed from a dimensionally stable non-stretch material, such as a woven fabric, and is dimensioned to closely engage and encapsulate the viscoelastic foam cushion 12. The woven fabric of the inner cover 14 can roll or bend, but will not stretch. Thus, the inner cover 14 will change shape in response to weight of the person and will permit a corresponding deformation of the viscoelastic foam cushion 12 at those locations where the weight of the sitting person applies direct forces on the seating pad assembly 10. Additionally, the inner cover 14 will permit some deformation of the lower surface of the viscoelastic foam cushion 12 into cracks and crevices of the seat 100. However, the inner cover 14 will prevent unimpeded deformation of the viscoelastic foam cushion 12 while still permitting comfort for the typical passenger (e.g. 195 pounds) and preventing a bottoming out of the ischium of the pelvis of the passenger at cracks and crevices in the seat 100. Furthermore, the dimensionally stable non-stretch inner cover 14 will cause the seating pad assembly to behave as if the viscoelastic foam cushion 12 is made from a firmer more dense material, while still providing comfort, with the passenger effectively floating or being suspended above the surface discontinuities of the seat. The inner cover 14 preferably is woven from cotton yarns or woven from a blend of cotton yarn and synthetic fibers or woven entirely from synthetic fibers. The woven inner cover may be constructed of a fabric having a thread count in a range from a minimum warp and filling of approximately 110×76 to a maximum warp and filling of approximately 220×140. Additionally, the fabric has a yarn size in a range of 32×32 to 60×60 singles. The warp or filling should be aligned to extend from the top end of the back support 106 of the seat to the front end of the hip/thigh support 102. An inner cover formed from these fabrics has the proven tensile strength to cause the otherwise pliant formulation of viscoelastic foam to provide additional support, particularly in the area between the hip/thigh support 102 and the back support 106 that exists when the back support is at a substantially erect or partly inclined orientation relative to the hip/thigh support 102. In this regard, at least the upper surface of the inner cover 14 will extend at approximately a 45°-60° angle from the hip/thigh support 102 to the back support 106 to provide support for lower regions of the back of the person substantially corresponding to the lumbar region, as illustrated in FIG. 6.

The combination of a dimensionally stable, non-stretch, woven inner cover 14 that closely encapsulates a viscoelastic foam 12 with a relatively high density of about 5 lb/ft$^3$ and a relatively high firmness of about 40 lbf surprisingly has been found to provide a high degree of comfort and support on a seat 100. The pad assembly 10 conforms sufficiently to surface discontinuities in the seat 100 and enables the person to float above the seat without bottoming out.

Figure 2:
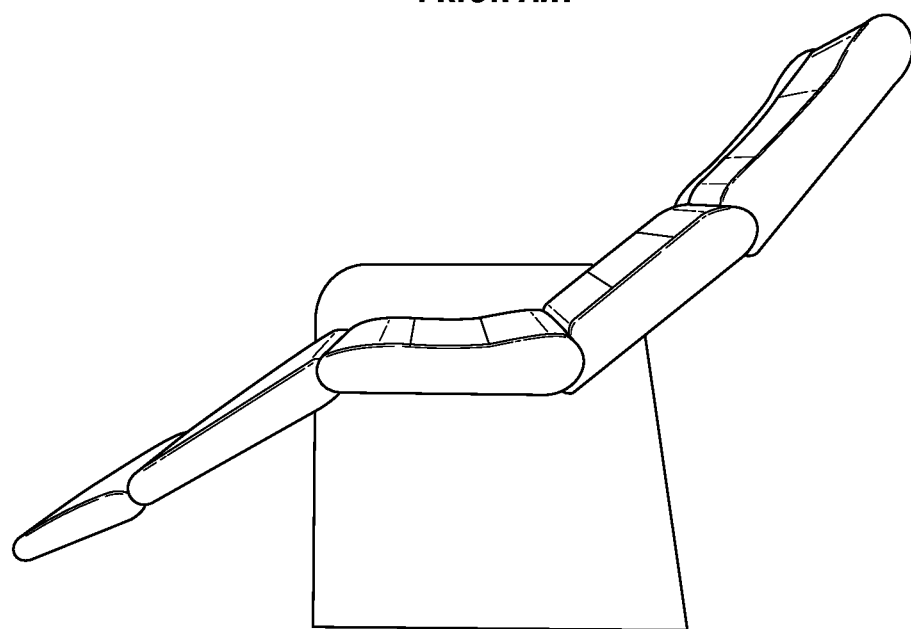
FIG. 2 is a longitudinal cross-sectional view of the airline seat of FIG. 1.
Figure 3:
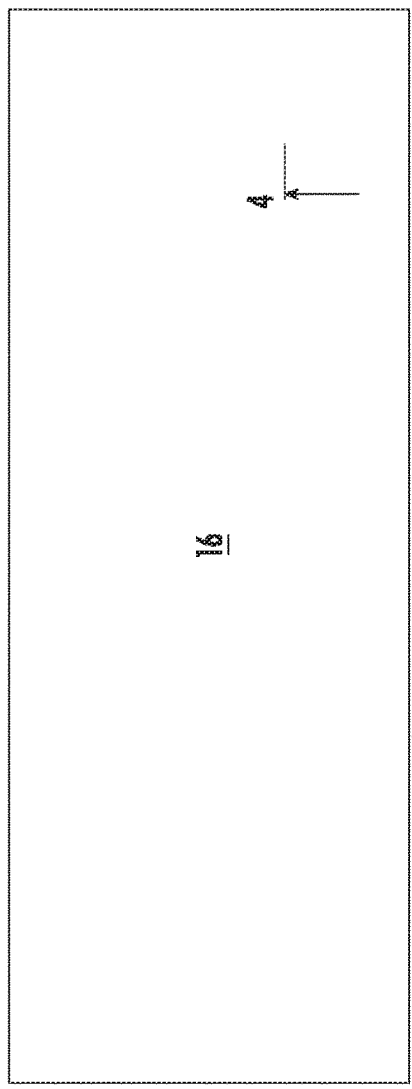
FIG. 3 is a top plan view of a seating pad assembly in accordance with an embodiment of the invention.
Figure 4:
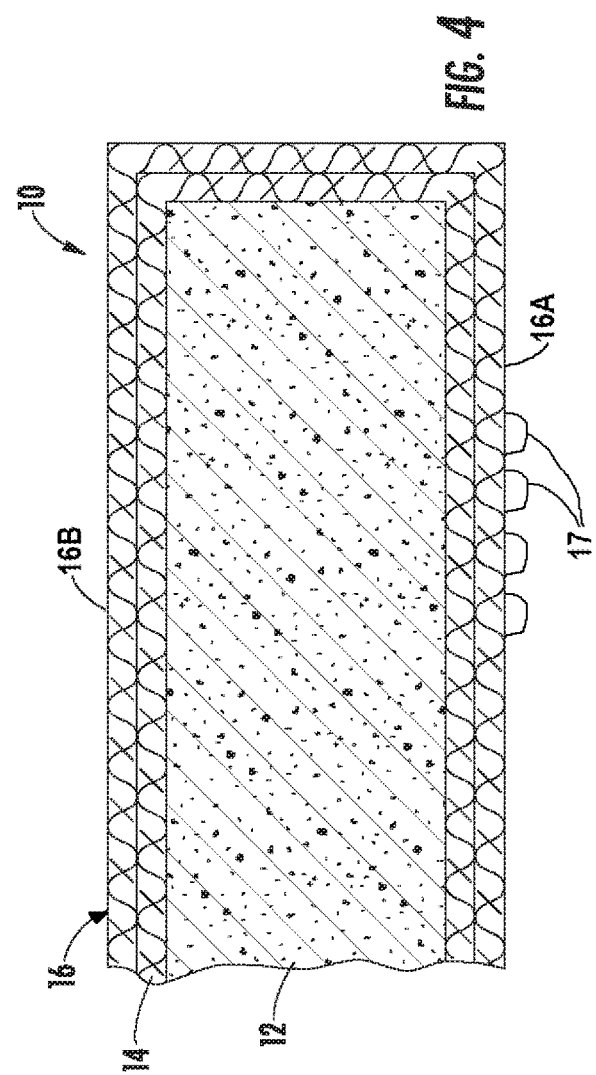
FIG. 4 is a cross-sectional view taken along line 4-4 of FIG. 3.

The outer cover 16 may be formed from a material that is stain resistant, antimicrobial, antibacterial, hydrophobic, wicking and easily cleaned upon removal of the outer cover 16 from the inner cover 14 and the viscoelastic foam cushion 12 encapsulated therein. The outer cover 16 may have a zipper or other such closure to permit easy removal of the inner cover 14 and the viscoelastic foam cushion 12 encapsulated therein. The outer cover 16 has a first sheet 16A and a second sheet 16B, as illustrated in FIGS. 2 and 3. The first sheet 16A that is disposed to face the seat 100 and the second sheet 16B that faces away from the seat 100. The outer cover 16 may further include areas of high friction on the surface of the first sheet 16A of the outer cover 16 that will face the seat 100. For example, small elastomeric regions 17 may be attached permanently to the surface of the first sheet 16A of the outer cover 16 that faces the seat 100 for frictionally engaging the seat 100 and resisting slippage or collapsing of the seating pad assembly 10 that has been placed on the seat 100. Alternatively, at least the surface of the first sheet 16A outer cover 16 facing the seat 100 may comprise fibers with appropriate friction characteristics or that can be modified at least locally to have friction characteristics to prevent slippage on the seat 100. When the seating pad assembly is to be used in a personal automobile, the outer cover 16 may have straps, a draw string or the like to wrap around the upper part of the back support 106 of the seat 100 or around the head rest support of the seat 100 to hold the seating pad assembly 10 in a position without collapsing or bunching up. Such straps are identified schematically in FIG. 6 by the reference number 16S. The straps 16S preferably extend from locations on the seating pad assembly spaced inward about 4.0 inches (about 10 cm) from the side edges of the seating pad assembly 10 so that the straps 16S extend from locations on the seating pad assembly 10 that will align with the supports of an adjustable headrest on an automobile seat. The first sheet 16A of material of the outer cover 16 that faces the seat 100 preferably is formed from a dimensionally stable non-stretch material to help hold the seating pad assembly 10 in a fixed position on the seat 100, while the second sheet 16B of material of the outer cover 16 that faces away from the seat 100 may be able to stretch or deform. For example, the second sheet 16B of material of the outer cover 16 that faces away from the seat 100 may be a knit material or a brushed knit material.

Figure 8:
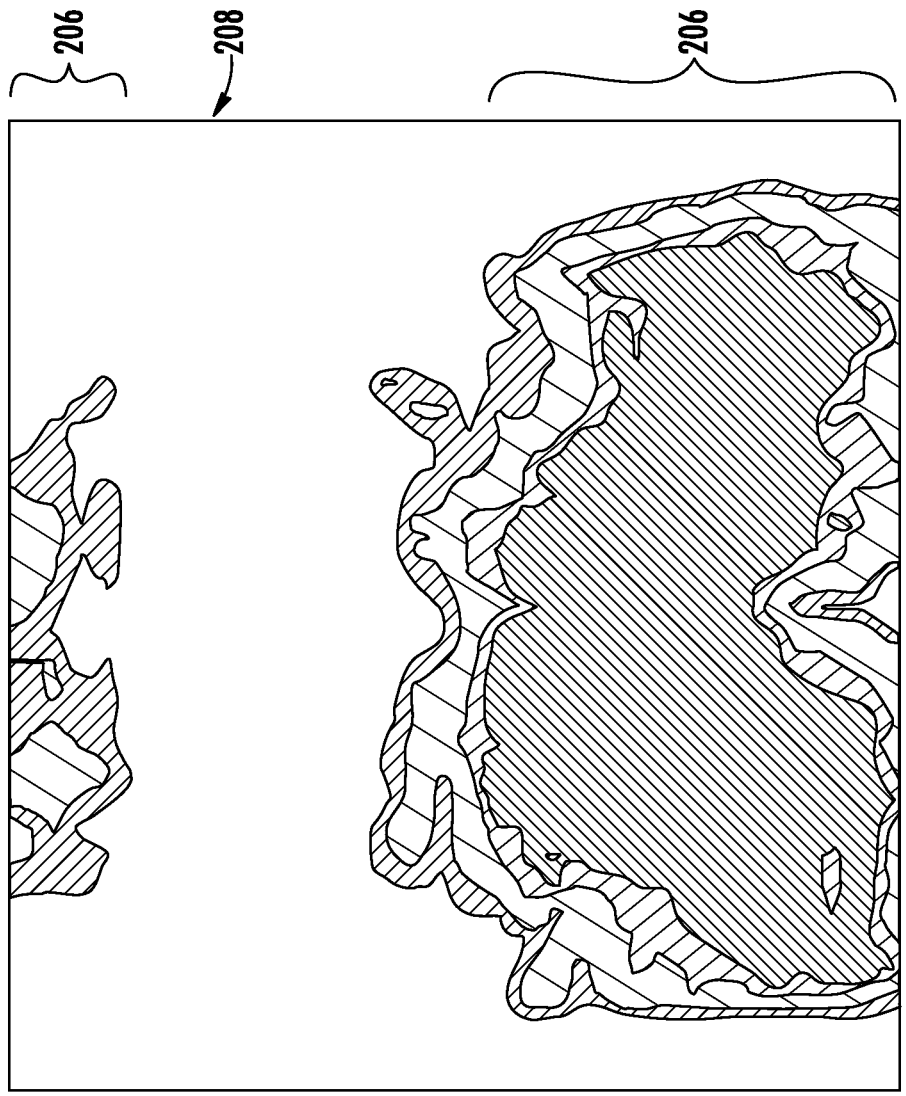
FIG. 8 is a graphic image of pressure mapping of a prior art seating pad assembly with a knit cover.
Figure 9:
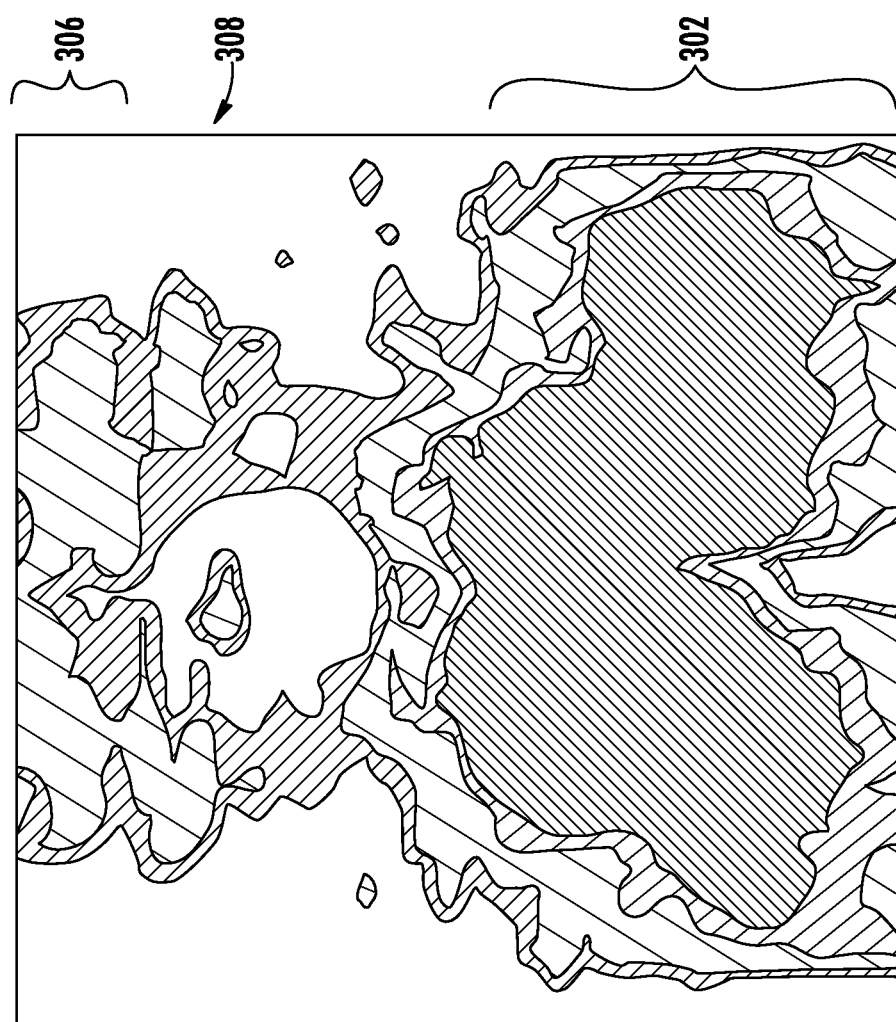
FIG. 9 is a graphic image of pressure mapping of a seating pad assembly of the invention with a cover made of a woven fabric that closely engages the viscolelastic foam.
Figure 10:
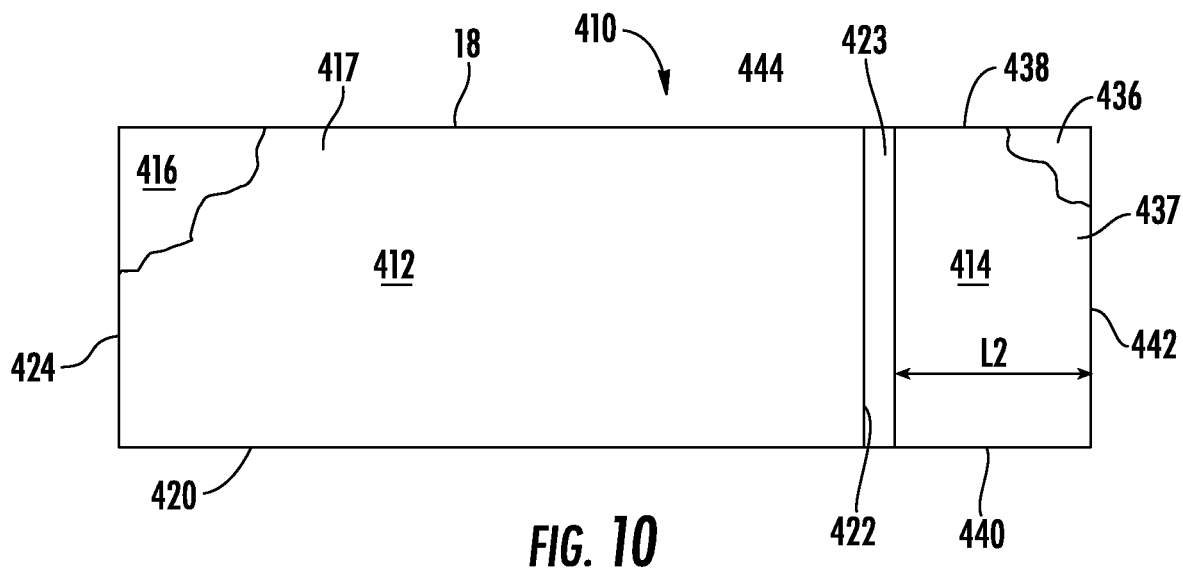
FIG. 10 is a top plan view of a seating pad assembly in accordance with an alternate embodiment of the invention where the seating pad assembly includes a main pad and an extension.
Figure 11:
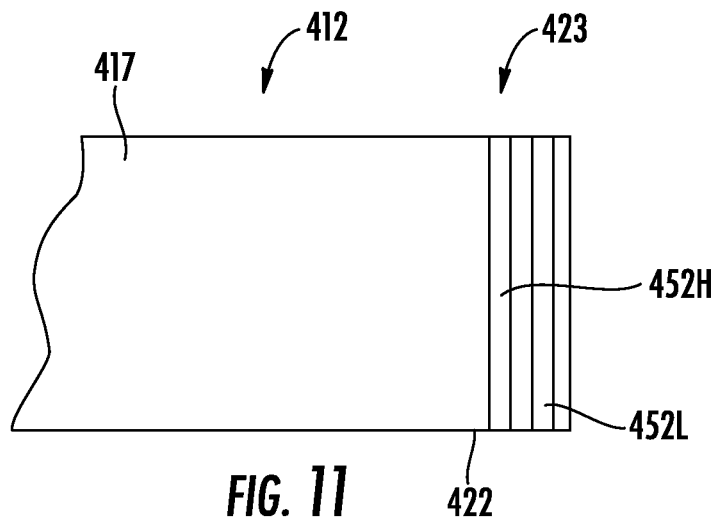
FIG. 11 is a bottom plan view of an end region of the main pad shown in FIG. 10.
Figure 12:
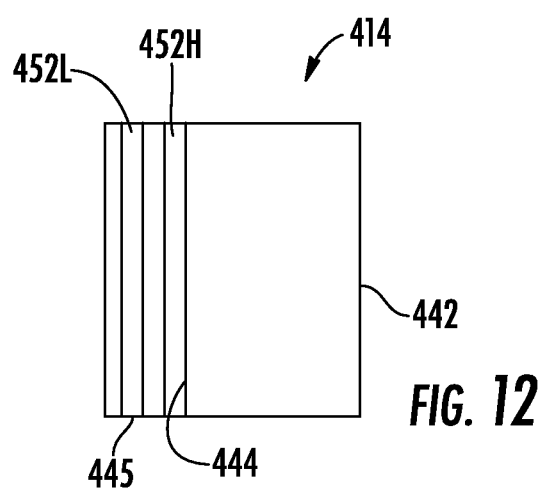
FIG. 12 is a top plan view of the extension shown in FIG. 10.
Figure 13:
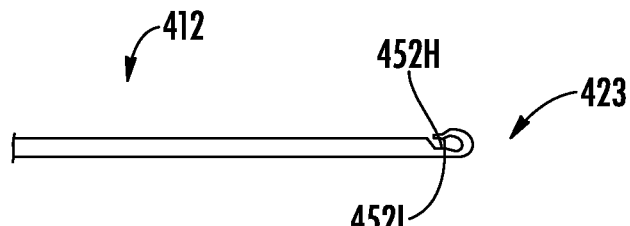
FIG. 13 is an enlarged side elevational view showing a flap with a loop-type fastener folded over and attached to a hook-type fastener on the main pad.
Figure 14:
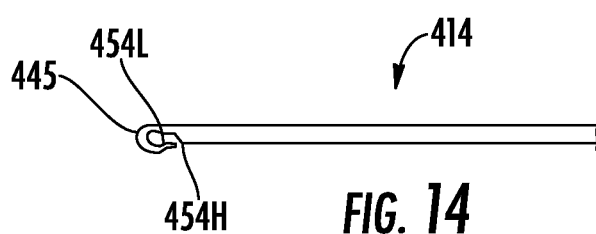
FIG. 14 is an enlarged side elevational view showing a flap with a loop-type fastener folded over and attached to a hook-type fastener of the extension.
Figure 15:
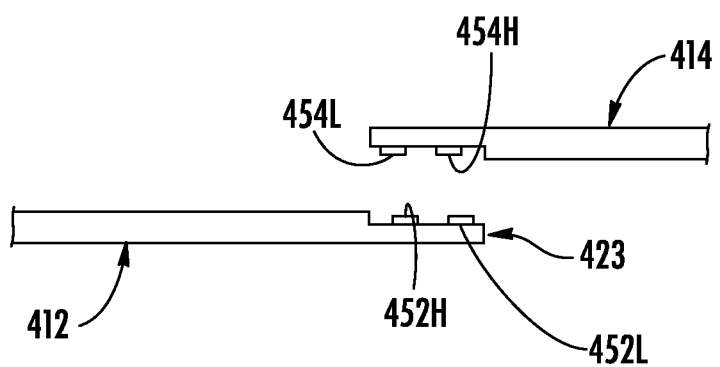
FIG. 15 is an exploded side elevational view showing the hook-type fastener and the loop-type fastener of the main pad disposed in opposed relationship to the hook-type fastener and the loop-type fastener of the extension of the tongue and groove connection structures.

FIGS. 8 and 9 graphically display the effects of the subject invention using pressure mapping. In this regard, FIG. 8 displays the results of pressure mapping on a viscoelastic seating pad assembly with a knit cover substantially as disclosed in U.S. Pat. No. 7,461,894. FIG. 9 displays the results of pressure mapping on a viscoelastic seating pad assembly with a woven cover that closely encapsulates the viscoelastic pad. The region 202 in FIG. 8 corresponds to the region of the viscoelastic pad assembly of U.S. Pat. No. 7,461,894 that supports the buttocks of the passenger above the hip/thigh support 102 of the airline seat 100. The region 206 in FIG. 8 corresponds to the region of the viscoelastic pad assembly of U.S. Pat. No. 7,461,894 that supports the upper back of the passenger relative to the back support 106 of the airline seat 100. The region 208 and FIG. 8 corresponds to an area aligned with the lower back or lumbar region of a passenger. The more dense shading areas in FIG. 8 correspond to areas where higher pressures are exerted between the passenger and the prior art seating pad. The pressure exerted between the passenger and the prior art seating pad assembly is essentially nonexistent regions of the prior art seating pad assembly opposed to the lower back or lumbar region of the passenger. The relative absence of pressure reflects the stretching of the knit cover and the tendency of this viscoelastic foam within the knit cover to conform to the gap 108 between the hip/thigh support 102 and the back support 106 of the airline seat 100.

In contrast, the region 302 in FIG. 9 corresponds to the region of the viscoelastic pad assembly of the subject invention that supports the buttocks of the passenger above the hip/thigh support 102 of the airline seat 100. The region 306 in FIG. 9 corresponds to the region of the viscoelastic pad assembly of the subject invention that supports the upper back of the passenger relative to the back support 106 of the airline seat 100. The region 308 in FIG. 9 corresponds to an area aligned with the lower back or lumbar region of a passenger. The more dense shading in the region 308 of FIG. 9 indicates that the seating pad assembly of the invention with the woven cover closely engaging the viscoelastic foam provides much greater support for the lower back or lumbar region of the passenger due to the ham mocking effect described above.

The pressure mapping in region 202 of FIG. 8 of the prior art viscoelastic pad assembly and the pressure mapping in the region 302 of FIG. 9 for the viscoelastic pad assembly of the subject invention show similar pressure responses across the buttocks and the hip/thigh support 102 of the seat 100, thereby indicating that the woven cover that closely engages the viscoelastic pad of the subject invention does not adversely affect the desirable performance of the prior art seating pad assembly at the weight-bearing areas of the seating pad assembly opposed to the buttocks. As a result, the seating pad assembly of the subject invention will allow the passenger to float above the surface discontinuities of the hip/thigh support 102 of the airline seat 100. Similarly, the pressure mapping in the region 206 of FIG. 8 of the prior art viscoelastic pad assembly and the pressure mapping in the region 306 of FIG. 9 for the viscoelastic pad assembly of the subject invention show similar pressure responses across the upper back and the back support 106 of the seat 100, thereby indicating that the woven cover that closely engages the viscoelastic pad of the subject invention does not adversely affect the desirable performance of the prior art seating pad assembly at the weight-bearing areas of the seating pad assembly opposed to the upper back. Accordingly, the seating pad assembly of the subject invention allows the passenger to float over surface discontinuities of the seat opposed to the main weight-bearing areas of the buttocks and upper back in a manner similar to the prior art, but provides very significantly more support across the critical lumbar region of the back when compared to the prior art seating pad assembly with a knit cover.

Thus, the deformation of the viscoelastic foam cushion 12 will be greatest at those locations where the forces exerted by the weight of the passenger are greatest. More particularly, the pelvic area and the upper back area of the passenger will exert the greatest forces on the seating pad assembly 10, thereby causing the greatest deformation at those locations. Additionally, the viscoelastic foam cushion 12 will exert the greatest conformal support on the passenger at those locations. However, the dimensionally stable woven inner cover 14 achieves a surprising benefit at locations between the pelvic area and upper back area of the passenger. In this regard, the pelvic area and the upper back area will effectively form anchors or supports against the seat 100. The upper surface of the inner cover 14 will extend between those anchors for providing very effective and comforting support for the lumbar region of the person on the seat with less support exerted by the viscoelastic foam cushion 12. This effect is illustrated graphically in FIGS. 6-9 by the lumbar support region 30 that closely follows and supports the lumbar region of the back across surface discontinuities of the airline seat 100 even though there will be significantly less or no deformation of the viscoelastic foam cushion 12 along the lumbar support region 30.

FIGS. 10-20 show an embodiment of the invention that includes an additional feature that is not shown in the preceding figures. A seating pad assembly in accordance with an embodiment of the invention is identified generally by the 410 in FIGS. 10-20. The seating pad assembly 410 includes a main pad 412 and an extension 414. The main pad 412 comprises an inner foam cushion 416 that preferably is formed at least partly of a viscoelastic material, similar to those described above. However inner foam cushion of this embodiment need not be a viscoelastic foam. The main pad 412 also includes at least one cover 417 disposed in surrounding relationship around the inner foam cushion 416. The at least one cover 417 may comprise a woven inner cover and an outer cover substantially as described above. The main pad 412 is substantially rectangular and has opposite sides 418 and 420 and opposite first and second ends 422 and 424 extending between the sides 418 and 420. The sides 418 and 420 are spaced apart by a width W that preferably is in a range of 16-20 inches. The ends 422 and 424 are spaced from one another by a length L1 that substantially corresponds to a sum of the lengths of the hip/thigh support 102 and the back support 106 of a typical coach class airline seat 100, as shown in FIG. 1. For example, a length L1 of the main pad 412 may be approximately 42 inches. A flexible flap 423 extends from the outer cover 417 at the first end 422 of the main pad 412.

The extension 414 similarly includes an inner foam cushion 436 that may be formed at least partly of a viscoelastic material, and an at least one cover 437 surrounds the inner foam cushion 436 of the extension 414. The extension 414 also is substantially rectangular and has opposite sides 438 and 440 defining a width W substantially equal to the width W of the main body 412. The extension 414 further has opposite first and second end edges 442 and 444 defining a length L2 that may be about 10-12 inches. A flexible flap 445 extends from the outer cover 436 at the second end 444 of the extension 414.

The first end 422 of the main body 412 and the second end 444 of the extension 414 are configured to form a releasable connection assembly 446. The releasable connection assembly 446 may comprise hook and loop fasteners 452 extending across the flexible flap 423 at the first end 422 of the main body 412 and hook and loop fasteners 454 extending across the flexible flap 445 at the second end 444 of the extension 414.

More particularly, the flexible flap 423 at the first and 422 of the main body 412 has a strip of a hook-type fastener 452H extending across the flexible flap 423 at a position near the main body 412 and a strip of loop-type fastener 452L extending across the flap at a position so that the hook-type fastener 452H is between the main body 412 and the loop-type fastener 452L.

Similarly, the flexible flap 445 of the extension 414 has a strip of a hook-type fastener 454H extending across the flexible flap 445 at a position substantially adjacent the pad of the extension 414 and a loop-type fastener extending across the flexible flap 445 at a position so that the hook-type fastener 454H extending across the flexible flap 445 at a position so that the hook-type fastener 454H is between the pad of the extension and the loop-type fastener 454L.

When the extension 414 is not required to be attached to the main body 412, the flexible flap 423 of the main body 412 is folded so that the loop-type fastener 452L releasably engages the hook-type fastener 452H for releasably holding the flexible flap 423 in the folded protective position so that the hook-type fastener 452H cannot damage clothing of the passenger. Similarly, the flexible flap 445 of the extension is folded so that the loop-type fastener 454L releasably engages the hook-type fastener 454H for releasably holding the flexible flap in the folded protective position so that the hook-type fastener 454H cannot damage clothing of the passenger or irritate the skin of the passenger.

When the extension 414 is required, the passenger merely unfolds the flexible flaps 423 and 445 so that the respective fasteners 452H, 452L, 454H and 454L are exposed. The flaps then are positioned in opposed relationship to one another and the loop-type fastener 454L of the extension 414 is pressed against and engaged with the hook-type fastener 452H of the main body 412. Simultaneously, the hook-type fastener 454 Eight of the extension 414 is pressed against and engaged with the loop-type fastener 452L of the main body 412. If the passenger subsequently determines that the extension is not necessary, it merely is necessary for the passenger to disengage the fasteners 454H and 454L of the extension 414 from the corresponding fasteners 452L and 452H of the main body. The flexible flaps 423 and 445 then are folded into the protective position and retained in that position until such time that the extension may be required.

Figure 16:
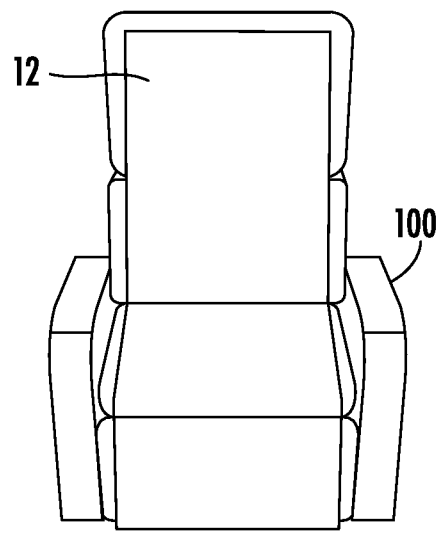
FIG. 16 is a side elevational view showing the extension connected to the main pad.
Figure 17:
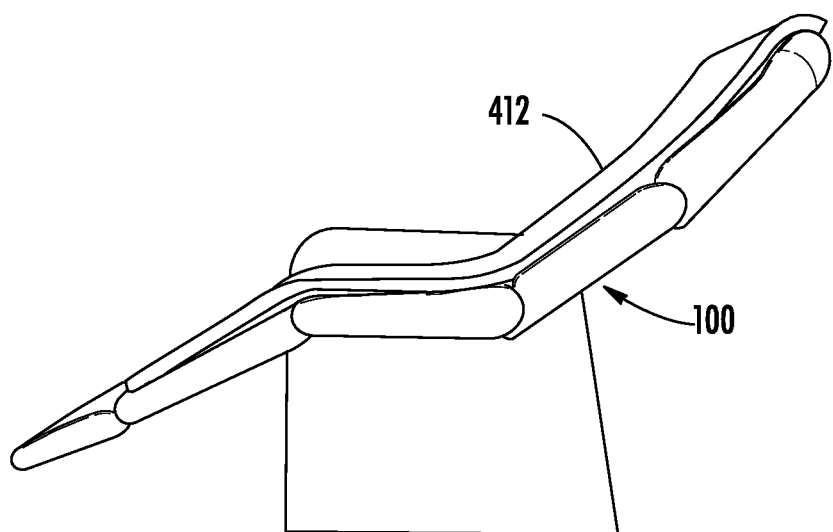
FIG. 17 is a side elevational view of the airline seat of FIG. 16 in a partially reclined position and with the main pad of the seating pad assembly of FIG. 11.
Figure 18:
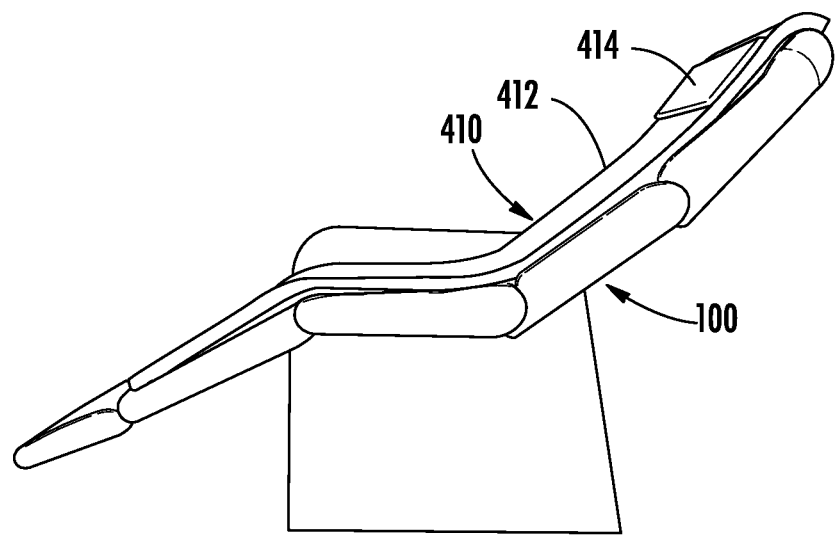
FIG. 18 is a side elevational view of the airline seat of FIG. 17 in the partially reclined position showing the main pad of the seating pad assembly of FIG. 13 along with an extension folded over from the main pad to function as a head pillow.

The seating pad assembly 410 comprised of the main pad 412 and the extension 414 can be used with the coach class seat 100 in the manner illustrated in FIGS. 16-18. The main pad 412 in the illustrated embodiment has a length L1 substantially corresponding to the combined length of the hip/thigh support 102 and the back support 106. As illustrated in FIG. 18, the pad assembly 410 is positioned with the extension 414 folded from the first end 422 of the main pad 412 so that the extension 414 lies in substantially face-to-face engagement with a surface area of the main pad 412 adjacent the first end 422. In this configuration, the extension 414 effectively functions as a head pillow.

Figure 19:
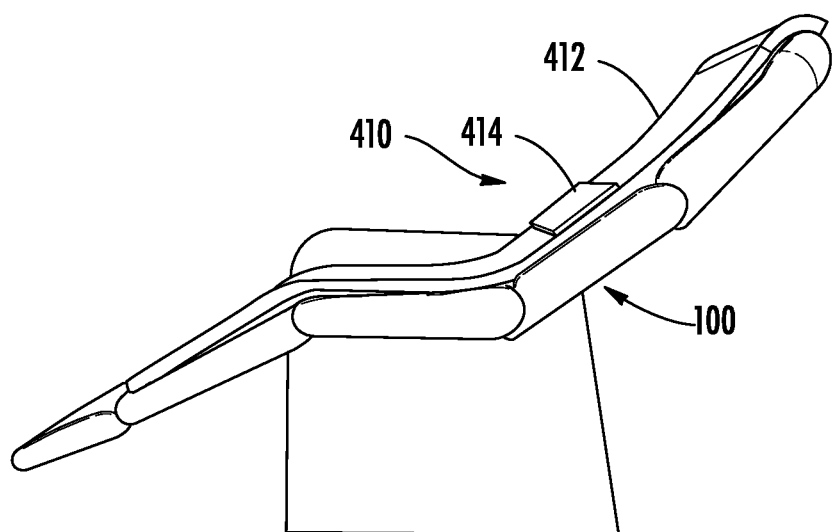
FIG. 19 is a side elevational view of the airline seat of FIG. 17 in a partially reclined position and with the main pad of the seating pad assembly of FIG. 17 along with an extension separated from the main pad and positioned as a pillow for additional lumbar support.

FIG. 19 illustrates an optional arrangement where the extension 414 is separated from the main pad 412 and positioned by the traveler as a lumbar support. Of course, in a variation of this option, the extension 414 is separated from the main pad 412 and not used at all. The traveler who knows he or she will be flying coach class can leave the extension 414 at home for a trip taken while flying in coach class.

Figure 20:
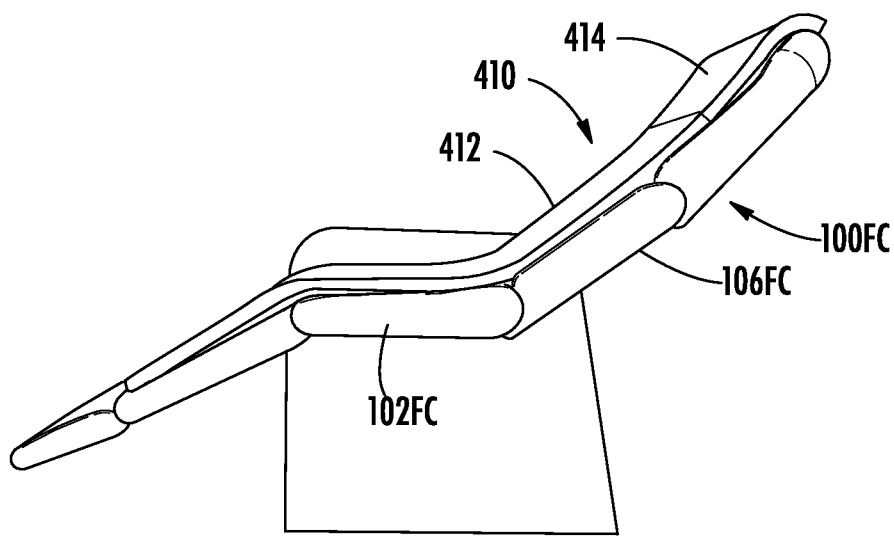
FIG. 20 is a side elevational view of an airline seat longer than the airline seat shown in FIGS. 17-19 and with the main pad and the extension of the seating pad assembly in an extended and unfolded orientation.

FIG. 20 illustrates the seating pad assembly 410 used with a first class or business seat 100FC. The combined length of the hip/thigh support 102FC and the back support 106FC of the first class seat 100FC exceeds the corresponding dimensions of the coach seat 100 by an amount that approximately equals the length L2 of the extension 414. As a result, the seating pad assembly 410 is used with the extension 414 extending as a substantially coplanar continuation of the main pad 412. In this situation, the free end edge 442 of the extension 414 substantially aligns with the top edge of the back support 106FC, while the second end 424 of the main body 412 aligns with the forward end of the foot rest 110.

The invention has been described with respect to certain preferred embodiments. However, there is changes can be made without departing from the scope of the invention as defined by the claims. For example, the figures illustrate a seat with a foot rest or leg rest that can be elevated. However, a foot rest or a leg rest that can elevate is not required. The illustrations also may be perceived as airline seats. However, the seating pad assembly is equally applicable for use with automobile seats, office chairs, stadium seats and any other seat where a seatback extends angularly from a hip/thigh support, particularly if there is a gap or dimensional incongruity at the corner between the back support and the hip/thigh support.

What is claimed is:

1. A method for enhanced support of a person on a seat, comprising:
providing a seat having a hip/thigh support and a back support extending angularly from the hip/thigh support;
providing a seating pad assembly having opposite first and second longitudinal ends, a foam cushion formed at least partly from a viscoelastic foam, at least one cover covering and closely encapsulating the foam cushion, the at least one cover being formed from a dimensionally stable material that is non-stretchable at least in a direction extending from the first longitudinal end to the second longitudinal end, and at least one attachment means in proximity to the first longitudinal end of the seating pad assembly;
removably attaching the attachment means to a part of the back support of the seat remote from the hip/thigh support;
positioning an area of the seating pad assembly adjacent the second longitudinal end of the seating pad assembly at a position on the seat spaced from the back support of the seat while keeping the seating pad assembly spaced from an intersection of the hip/thigh support and the back support;

sitting on the hip/thigh support; and leaning back against an area of the back support spaced from the hip/thigh support so that the foam cushion encapsulated by the cover formed from the dimensionally stable non-stretchable material cradles a lower back region above an end of the hip/thigh support that extends angularly from the back support.

2. The method of claim 1, wherein the cover is an inner cover, the seating pad assembly further comprising an outer cover positioned over the inner cover, the attachment means being part of or attached to the outer cover.

3. The method of claim 2, wherein the attachment means comprise straps secured to the area of the outer cover in proximity to the first longitudinal end of the seating pad assembly, and wherein the step of attaching the attachment means to a part of the back support of the seat remote from the hip/thigh support comprises attaching the straps to an area of the back support remote from the hip/thigh support.

4. The method of claim 3, wherein the seat is an automobile seat with a head rest at an end of the back support of the seat remote from the hip/thigh support, and the step of attaching the straps to an area of the back support remote from the hip/thigh support comprises attaching the straps to the head rest or a support of the head rest extending from the seat back.

5. The method of claim 4, wherein the outer cover comprises first and second sheets of outer material that face oppositely from one another, the attachment means further comprises regions of the first sheet of outer material with frictional characteristics that resist sliding of the seating pad assembly on the seat, the step of attaching the attachment means to a part of the back support of the seat remote from the hip/thigh support further comprises positioning the seating pad assembly so that the regions of the first sheet of outer material with the frictional characteristics that resist sliding of the seating pad assembly on the seat face toward the seat back.

6. The method of claim 2, wherein the outer cover comprises first and second sheets of outer material that face oppositely from one another, the attachment means comprises regions of the first sheet of outer material with frictional characteristics that resist sliding of the seating pad assembly on the seat, the step of attaching the attachment means to a part of the back support of the seat remote from the hip/thigh support comprises positioning the seating pad assembly so that the regions of the first sheet of the outer material with the frictional characteristics that resist sliding of the seating pad assembly on the seat face toward the seat back.

7. The method of claim 1, wherein the at least one cover formed from the dimensionally stable material that is non-stretchable at least in a direction extending from the first longitudinal end to the second longitudinal end of the seating pad assembly is a dimensionally stable woven fabric cover formed from warp yarns and filler yarns, at least the warp yarns are non-stretchable, the warp yarns extending in the direction from the first longitudinal end of the seating pad assembly toward the second longitudinal end thereof and wherein the step of attaching the attaching means to a part of the back support of the seat remote from the hip/thigh support is carried out so that the non-stretchable warp yarns extend in the direction from the end of the back support remote from the hip/thigh support toward an end of the hip/thigh support remote from the back support.

8. The method of claim 1, wherein a pad extension is removably attachable to the second end of the seating pad assembly, the method further comprising removably attaching the pad extension to the second end of seating pad assembly so that the seating pad assembly and the pad extension have a combined length sufficient to extend at least to the end of the hip/thigh support remote from the back support.

9. The method of claim 8, wherein the second end of the seating pad assembly and the pad extension comprise mating hook and loop fastening attachments, and wherein the step of removably attaching the pad extension to the second end of seating pad assembly comprises releasably attaching the mating hook and loop fastening attachments.

10. A seating pad assembly comprising:
a foam pad formed from an open cell foam material;
an inner cover formed from a first dimensionally stable, non-stretch material closely encapsulating the foam pad;
an outer cover having a first sheet of material defining a surface of the seating pad assembly to be positioned on a seat and a second sheet of material defining a surface of the seating pad assembly to face away from the seat, at least the first sheet of material being formed from a second dimensionally stable, non-stretch material; and
anchoring means attached to the first sheet of material of the outer cover for anchoring the seating pad assembly on a seat.

11. The seating pad assembly of claim 10, wherein the foam pad comprises a viscoelastic foam material.

12. The seating pad assembly of claim 10, wherein the first sheet of material of the outer cover is a woven fabric.

13. The seating pad assembly of claim 12, wherein the second sheet of material of the outer cover is a material different from the first sheet of material of the outer cover.

14. The seating pad assembly of claim 10, wherein the anchoring means comprises straps attached to the first sheet of material of the outer cover.

15. The seating pad assembly of claim 10, wherein the anchoring means comprises elastomeric materials incorporated into the first sheet of material of the outer cover.

* * * * *